United States Patent
Sakuma et al.

(10) Patent No.: US 11,890,610 B2
(45) Date of Patent: *Feb. 6, 2024

(54) COBALT ION ADSORBENT, METHOD FOR PRODUCING SAME AND TREATMENT APPARATUS FOR COBALT ION-CONTAINING LIQUID

(71) Applicant: TITAN KOGYO KABUSHIKI KAISHA, Yamaguchi (JP)

(72) Inventors: Takashi Sakuma, Tokyo (JP); Makoto Komatsu, Tokyo (JP); Takeshi Izumi, Tokyo (JP); Nobuyuki Hashimoto, Yamaguchi (JP); Toshimasa Seki, Yamaguchi (JP); Takafumi Tanaka, Yamaguchi (JP); Hidenori Ishioka, Yamaguchi (JP)

(73) Assignee: TITAN KOGYO KABUSHIKI KAISHA, Yamaguchi (JP)

( * ) Notice: Subject to any disclaimer, the term of this patent is extended or adjusted under 35 U.S.C. 154(b) by 490 days.

This patent is subject to a terminal disclaimer.

(21) Appl. No.: 17/272,215

(22) PCT Filed: Sep. 3, 2019

(86) PCT No.: PCT/JP2019/034616
§ 371 (c)(1),
(2) Date: Feb. 26, 2021

(87) PCT Pub. No.: WO2020/050270
PCT Pub. Date: Mar. 12, 2020

(65) Prior Publication Data
US 2021/0316296 A1   Oct. 14, 2021

(30) Foreign Application Priority Data
Sep. 5, 2018 (JP) .................................. 2018-166156

(51) Int. Cl.
*B01J 39/02* (2006.01)
*B01J 39/10* (2006.01)
*B01J 47/02* (2017.01)
*C01G 23/00* (2006.01)
*B01J 47/018* (2017.01)
*G21F 9/12* (2006.01)

(52) U.S. Cl.
CPC ............... *B01J 39/02* (2013.01); *B01J 39/10* (2013.01); *B01J 47/018* (2017.01); *B01J 47/02* (2013.01); *C01G 23/005* (2013.01); *G21F 9/12* (2013.01); *C01P 2002/72* (2013.01); *C01P 2004/61* (2013.01)

(58) Field of Classification Search
CPC .......... B01J 39/02; B01J 39/10; C01G 23/005
See application file for complete search history.

(56) References Cited

FOREIGN PATENT DOCUMENTS

| EP | 3593899 A1 | 1/2020 |
|---|---|---|
| JP | H01-258737 A | 10/1989 |
| JP | 2015-188798 A | 11/2015 |
| JP | 2016-195981 A | 11/2016 |
| WO | 9714652 A1 | 4/1997 |
| WO | 2018/163954 A1 | 9/2018 |

OTHER PUBLICATIONS

International Application No. PCT/JP2019/034616, International Search Report dated Nov. 26, 2019, 2 pages.
Komatsu et al., "Adsorption Behavior Of Cobalt(II) Ions On Layered Dihydrogen Tetratitanate Hydrate Fibers In Aqueous Solutions In The Range From 298 To 523 K" Solvent Extraction and Ion Exchange, National Institute for Research in Inorganic Materials, vol. 8, No. 1, Feb. 1, 1990, pp. 173-185.
Extended European Search Report for EP Patent Application No. 19858383.3 dated Apr. 28, 2022.

*Primary Examiner* — Bradley R Spies
(74) *Attorney, Agent, or Firm* — COZEN O'CONNOR

(57) ABSTRACT

The present invention provides a particulate cobalt ion adsorbent which has a high adsorption capacity. A particulate cobalt ion adsorbent which contains potassium hydrogen dititanate hydrate represented by chemical formula $K_{2-x}H_xO.2TiO_2.nH_2O$ (wherein x is 0.5 or more and 1.3 or less, and n is greater than 0), and no binder, wherein the particulate cobalt ion adsorbent has a particle size range of 150 μm or more and 1000 μm or less.

12 Claims, 2 Drawing Sheets

COBALT ION ADSORBENT, METHOD FOR PRODUCING SAME AND TREATMENT APPARATUS FOR COBALT ION-CONTAINING LIQUID

TECHNICAL FIELD

The present invention relates to a cobalt ion adsorbent, a method for producing the same, and an apparatus for treating cobalt ion-containing liquid.

BACKGROUND ART

Radioactive isotopes, strontium-90 ($^{90}$Sr) and cesium-137 ($^{137}$Cs) are produced by fission of uranium and plutonium, whereas the radioactive cobalt isotope cobalt-60 ($^{60}$Co) is produced by capturing neutrons of cobalt-59 ($^{59}$Co). In an operation of a nuclear reactor, $^{60}$Co is produced from the $^{59}$Co contained in the primary cooling water pipe and cooling water. $^{60}$Co undergoes beta decay to nickel-60 ($^{60}$Ni), and the decay product $^{60}$Ni undergoes gamma decay to emit 1.17 MeV and 1.33 MeV gamma rays. Since these gamma rays have strong penetrating power and a large amount of energy, they can be a strong source of radiation exposure. Therefore, the development of purification treatment technology for water contaminated with $^{60}$Co has become a challenge. However, a technology for removing a trace amount of $^{60}$Co has not been established, and it is desired to supply a cobalt ion adsorbent having a large cobalt ion adsorption capacity, and excellent mechanical strength and handleability as a treatment agent for radioactive cobalt contaminated water without generating fine powder.

SUMMARY OF INVENTION

Technical Problem

An object of the present invention is to provide a cobalt ion adsorbent having a large cobalt ion adsorption capacity. It is also an object of the present invention to provide a cobalt ion adsorbent which has a large cation exchange capacity, excellent mechanical strength, no generation of fine powder, and excellent handleability and is suitable for decontamination of radioactive cobalt ion-containing liquid (in particular, radioactive cobalt contaminated water), by using the cobalt ion adsorbent without impairing original adsorption characteristics of the adsorbent, and a method for producing the same. Another object of the present invention is to provide an apparatus for treating radioactive cobalt ion-containing liquid, filled with this cobalt ion adsorbent.

Solution to Problem

The present inventors have found, as a result of diligent experimentation to solve the above problems, that by hydration and a cation exchange reaction with potassium ions (K$^+$) and protons (H$^+$) of potassium dititanate represented by chemical formula K$_2$O.2TiO$_2$, when a composition is converted to potassium hydrogen dititanate hydrate represented by chemical formula K$_{2-x}$H$_x$O.2TiO$_2$.nH$_2$O wherein x is 0.5 or more and 1.3 or less, and n is greater than 0, a structural conversion occurs at the same time, which increases a cation exchange capacity with cobalt ions, i.e., which exhibits excellent cobalt ion adsorption performance. Furthermore, the present inventors have found that granulating the potassium hydrogen dititanate hydrate without using a binder can provide a particulate cobalt ion adsorbent with little fine powder generation, and having excellent handleability while maintaining an original cation adsorption capacity of the potassium hydrogen dititanate hydrate, and thus have completed the present invention.

Namely, the specific aspects of the present invention are as follows:

[1] A particulate cobalt ion adsorbent comprising potassium hydrogen dititanate hydrate represented by chemical formula K$_{2-x}$H$_x$O.2TiO$_2$.nH$_2$O wherein x is 0.5 or more and 1.3 or less, and n is greater than 0, and no binder, wherein the particulate cobalt ion adsorbent has a particle size range of 150 μm or more and 1000 μm or less.

[2] The particulate cobalt ion adsorbent according to [1] above, wherein the particulate cobalt ion adsorbent has an X-ray diffraction peak at 2 θ=8.5±2.0° in X-ray diffraction using Cuk$_\alpha$-ray as an X-ray source.

[3] The particulate cobalt ion adsorbent according to [1] or [2] above, wherein the particulate cobalt ion adsorbent exhibits a cobalt adsorption performance represented by B.V. of 8000 m$^3$/m$^3$ or more at breakthrough at which a percentage of a cobalt concentration in water at an outlet (C) based on a cobalt concentration in water at inlet (C$_0$) is greater than 3%, wherein the particulate cobalt ion adsorbent is filled in a cylindrical column having an inner diameter of 15.96 mm to a layer height of 10 cm, and a simulated contaminated seawater comprising 3 g/kg of a normal salt, 1 mg/kg of cobalt, 5 mg/kg of magnesium, and 1 mg/kg of cesium is passed through the column at a flow rate of 6.5 mL/min (a linear water flow velocity of 2 m/h and a space velocity of 20 h$^{-1}$).

[4] A method for producing the particulate cobalt ion adsorbent according to any one of [1] to [3] above, comprising subjecting potassium dititanate represented by chemical formula K$_2$O.2TiO$_2$ to hydration and cation exchange between potassium ions (K$^+$) and protons (H$^+$) to obtain potassium hydrogen dititanate hydrate represented by chemical formula K$_{2-x}$H$_x$O.2TiO$_2$.nH$_2$O wherein x is 0.5 or more and 1.3 or less, and n is greater than 0, and granulating the potassium hydrogen dititanate hydrate without using a binder.

[5] The method according to [4] above, comprising steps of:
(1) mixing a titanium source and a potassium source,
(2) firing the resulting mixture to obtain potassium dititanate,
(3) contacting potassium dititanate with water to subject potassium dititanate to hydration and cation exchange between potassium ions and protons,
(4) wet pulverizing the resulting potassium hydrogen dititanate hydrate (K$_{2-x}$H$_x$O$_2$TiO$_2$.nH$_2$O wherein x is 0.5 or more and 1.3 or less, and n is greater than 0) in a slurry,
(5) subjecting the slurry to solid-liquid separation to separate a filtered cake comprising potassium hydrogen dititanate hydrate from the slurry,
(6) granulating the filtered cake into particles of potassium hydrogen dititanate hydrate without using a binder,
(7) drying potassium hydrogen dititanate hydrate at a temperature of 60° C. or higher and 150° C. or lower for 1 hour or longer and 24 hours or shorter, and
(8) cracking and sizing the dried potassium hydrogen dititanate hydrate to obtain a particulate cobalt ion adsorbent having a particle size range of 150 µm or more and 1000 µm or less.

[6] An apparatus for treating cobalt ion-containing liquid, filled with the particulate cobalt ion adsorbent according to any one of [1] to [3] above.

[7] An apparatus for decontaminating radioactive cobalt, filled with the particulate cobalt ion adsorbent according to any one of [1] to [3] above.

[8] A method for treating cobalt ion-containing liquid, using the particulate cobalt ion adsorbent according to any one of [1] to [3] above.

[9] A method for decontaminating radioactive cobalt, using the particulate cobalt ion adsorbent according to any one of [1] to [3] above.

[10] A method for treating cobalt ion-containing liquid, comprising passing cobalt ion-containing liquid through an apparatus for treating cobalt ion-containing liquid, filled with the particulate cobalt ion adsorbent according to any one of [1] to [3] above at a linear water flow velocity (LV) of 1 m/h or more and 40 m/h or less and a space velocity (SV) of 5 $h^{-1}$ or more and 40 $h^{-1}$ or less.

[11] A method for decontaminating radioactive cobalt, comprising passing radioactive cobalt-containing liquid through a decontamination apparatus for radioactive cobalt, filled with the particulate cobalt ion adsorbent according to any one of [1] to [3] above at a linear water flow velocity (LV) of 1 m/h or more and 40 m/h or less and a space velocity (SV) of 5 $h^{-1}$ or more and 40 $h^{-1}$ or less.

Advantageous Effects of Invention

According to the present invention, by using potassium hydrogen dititanate hydrate represented by chemical formula $K_{2-x}H_xO.2TiO_2.nH_2O$ wherein x is 0.5 or more and 1.3 or less, and n is greater than 0, a cobalt ion adsorption capacity can be improved as compared with that by other alkali metal titanate. Moreover, it is possible to produce a particulate cobalt ion adsorbent having high mechanical strength and excellent adsorption performance without using a binder.

DESCRIPTION OF EMBODIMENTS

Figure 1:
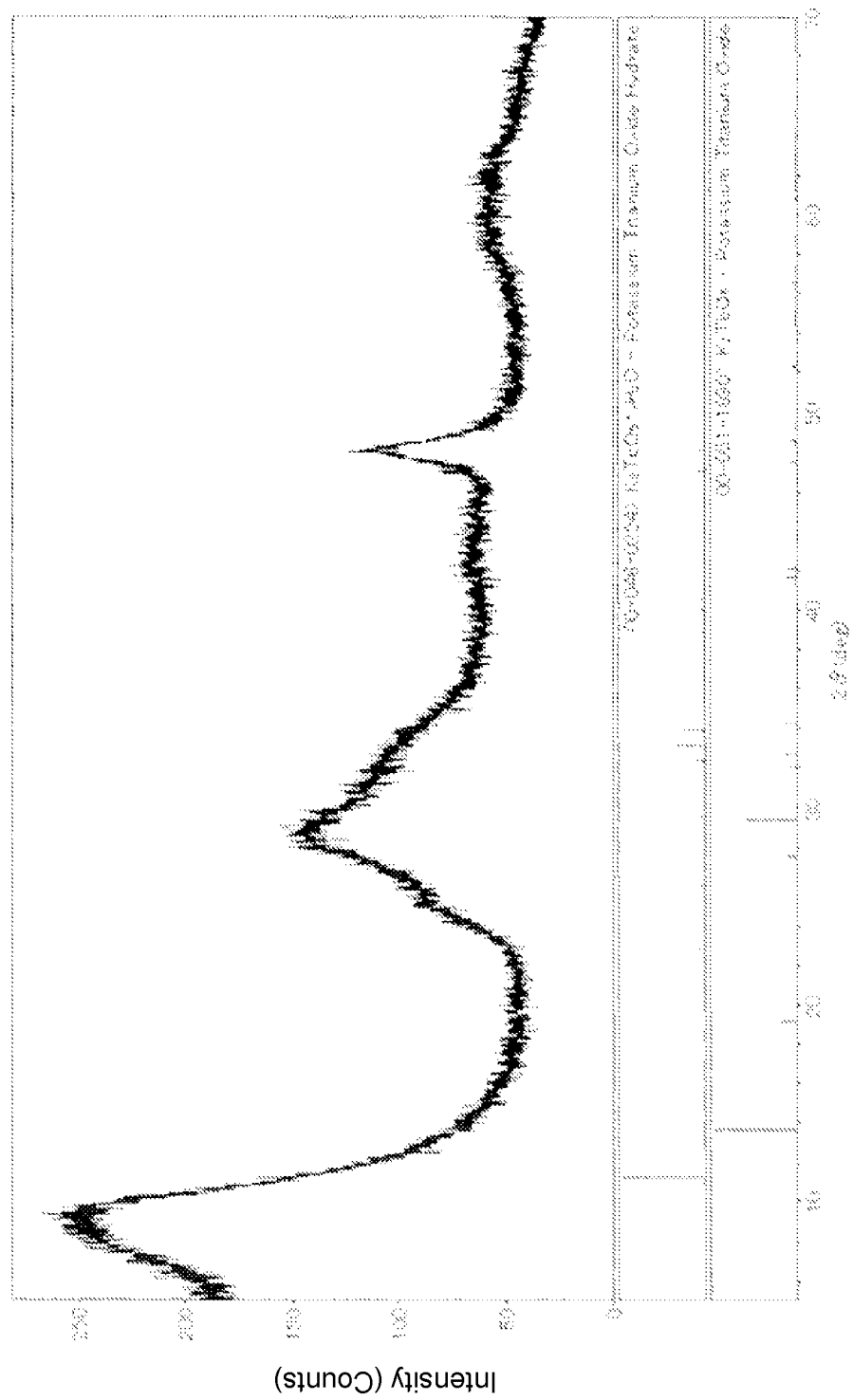
FIG. 1 is an X-ray diffraction spectrum of potassium hydrogen dititanate hydrate obtained in Example 1.

Embodiments of the present invention will now be described in more detail below. The embodiments described below are provided to aid the understanding of the present invention, and the present invention is not limited to the embodiments. The present invention may be implemented with appropriate modifications of elements disclosed in the following embodiments within the scope of the present invention.

The cobalt ion adsorbent of the present invention is characterized in that it contains no binder and contains potassium hydrogen dititanate hydrate represented by chemical formula $K_{2-x}H_xO.2TiO_2.nH_2O$ wherein x is 0.5 or more and 1.3 or less, and n is greater than 0. When x is larger than 1.3, cleavage of a layer composed of $TiO_5$ trigonal bipyramids is likely to occur, a strength is lowered during granulation, and a particulate cobalt ion adsorbent having high mechanical strength cannot be obtained. On the other hand, when x is smaller than 0.5, adsorption ability deteriorates. The cobalt ion adsorption ability is exhibited when x is 0.5 or more and 1.3 or less and an interlayer distance is being widened, and therefore a hydrated state, i.e., the value of n, is not limited, but n is more than 0 and 2 or less, is preferred.

The alkali metal titanate is generally represented by chemical formula $M_2O.mTiO_2$ (M: a monovalent cation excluding $H^+$, and m=1, 2, 3, 4, 6, 8, etc.). The alkali metal titanate as a cation exchanger has a smaller number of cation exchange sites per molecule of the alkali metal titanate as m becomes larger, and therefore it has a smaller cation exchange capacity. Thus, regarding the cation exchange capacity, alkali metal monotitanate represented by chemical formula $M_2O.TiO_2$ (M: a monovalent cation excluding $H^+$) wherein m is 1, is ideal. However, alkali metal monotitanate is extremely unstable. For example, by heating, it immediately undergoes disproportionation of alkali metal dititanate: chemical formula $M_2O.2TiO_2$ (M: a monovalent cation excluding $H^+$) and alkali oxide: chemical formula $M_2O$ (M: a monovalent cation excluding $H^+$). On the other hand, alkali metal dititanate: chemical formula $M_2O.2TiO_2$ (M: a monovalent cation excluding $H^+$) wherein m is 2, is thermally stable and has excellent resistance to chemicals such as acids and alkalis, and is suitable as an adsorbent for water treatment. The particulate cobalt ion adsorbent of the present invention contains as a main component, potassium hydrogen dititanate hydrate: chemical formula $K_{2-x}H_xO.2TiO_2.nH_2O$ wherein x is 0.5 or more and 1.3 or less, and n is greater than 0, which is obtained by hydrating potassium dititanate represented by chemical formula $K_2O.2TiO_2$ and cation exchanging between $K^+$ ions and protons ($H^+$), and no binder.

The cobalt ion adsorbent of the present invention is a particulate cobalt ion adsorbent that contains no binder and has a particle size range of 150 µm or more and 1000 µm or less, preferably 150 µm or more and 600 µm or less, and more preferably 150 µm or more and 300 µm or less. The cobalt ion adsorbent containing particles having a particle size in the above range exhibits not only high adsorption ability, but also excellent mechanical strength, and allows easy handling, and thus can be easily filled in an adsorption tower, etc., for removing cobalt ions.

The potassium hydrogen dititanate hydrate used in the present invention has a diffraction peak at 2θ, indicating the interlayer distance, of 8.5±2.0° in X-ray diffraction using Cukα as an X-ray source. This peak reflects an interlayer size, and when the 2θ is in this range, high cobalt ion adsorption ability can be exhibited. The characteristic peak of this X-ray diffraction is generated via step of mixing potassium dititanate: chemical formula $K_2O.2TiO_2$ with water to form a hydrate.

The particulate cobalt ion adsorbent of the present invention can be produced by (1) mixing a titanium source and a potassium source, (2) firing the resulting mixture to obtain potassium dititanate, (3) contacting potassium dititanate with water (slurrification) to subject potassium dititanate to hydration and cation exchange between potassium ions and protons, (4) wet pulverizing the resulting potassium hydrogen dititanate hydrate ($K_{2-x}H_xO.2TiO_2.nH_2O$ wherein x is 0.5 or more and 1.3 or less, and n is greater than 0) in a slurry, (5) subjecting the slurry to solid-liquid separation to separate a filtered cake comprising potassium hydrogen dititanate hydrate from the slurry, (6) granulating the filtered cake into particles of potassium hydrogen dititanate hydrate without using a binder, (7) drying potassium hydrogen dititanate hydrate so as to have a predetermined interlayer distance, and (8) cracking and sizing the dried potassium hydrogen dititanate hydrate to obtain a particulate cobalt ion adsorbent having a desired particle size range.

Potassium hydrogen dititanate hydrate represented by chemical formula $K_{2-x}H_xO.2TiO_2.nH_2O$ wherein x is 0.5 or more and 1.3 or less, and n is greater than 0, is obtained by dissolving ilmenite by a sulfuric acid method, mixing the obtained metatitanic acid slurry with potassium sources such as potassium carbonate, potassium hydrogen carbonate, potassium hydroxide, and potassium oxide, drying and firing to obtain potassium dititanate ($K_2O.2TiO_2$), which is then hydrated by mixing with water, and is subjected to a cation exchange reaction between potassium ions ($K^+$) and protons ($H^+$).

Potassium hydrogen dititanate hydrate can be granulated into particles with high mechanical strength without using a binder.

Hereinafter, a method for producing the particulate cobalt ion adsorbent of the present invention will be described for each step.

[Material]

As the titanium source used in the present invention, titanium dioxide, titanium suboxide, orthotitanic acid or a salt thereof, metatitanic acid or a salt thereof, titanium hydroxide, etc., can be used alone or in combination of two or more thereof. In particular, metatitanic acid can be preferably used. Since metatitanic acid is obtained as a slurry after dissolving titanium ore such as ilmenite with sulfuric acid and hydrolyzing it, it is cheaper than a fired product. Furthermore, metatitanic acid is finer than the fired product, and therefore, excellent in mixability and reactivity with a potassium source.

As the potassium source, potassium carbonate, potassium hydroxide, potassium oxalate, etc., can be used alone or in combination of two or more thereof. The potassium source that melts in a firing reaction is preferred, and carbonates thereof are particularly preferred. Potassium carbonate is preferred because it melts or decomposes in the firing reaction with the titanium source, facilitates reactions, and generates no by-products even after decomposition except for generating chemically inactive carbon dioxide.

[Mixing]

As a mixing proportion of the titanium source and the potassium source, K is preferably 0.95 mol or more and 1.25 mol or less relative to 1 mol of Ti. When the proportion of K to 1 mol of Ti is less than 0.95 mol, an amount of impurities such as potassium tetratitanate is large, and when the proportion of K to 1 mol of Ti is larger than 1.25 mol, excess potassium remains without generating potassium titanate. In either case, the cation exchange capacity becomes small and the cobalt ion adsorption capacity decreases. Composition analysis is shown by a value measured by an inductively coupled plasma mass spectrometer ICP-Mass (Agilent 7700x ICP-MS manufactured by Agilent Technologies, Inc.). The titanium source and the potassium source can be mixed by dry mixing using solids for both raw materials, or wet mixing using a slurry or an aqueous solution for either one raw material or for both raw materials.

In the case of dry mixing, the resulting mixture can be fired as it is. In the case of wet mixing, a mixed slurry of titanium source and potassium source is dried by an appropriate method and then fired. In order to dry the mixed slurry easily and efficiently, it may undergo granulation before drying. As the granulation method from the slurry, a normal granulation method, for example, a method for extruding a highly viscous slurry from a perforated plate, etc., can be used without limitation. A type of drying apparatus and a heat source for drying are not particularly limited. When the drying time is long, water-soluble potassium moves from an inside of the bulk to a surface of the bulk in accordance with movement of the water, resulting in a bias of a Ti/K molar ratio, and therefore, a spray drying method in which a drying time is short, is preferred.

[Firing]

Potassium dititanate is obtained by firing a raw material mixture of titanium sources and potassium sources. The firing temperature and firing time are not particularly limited, but it is preferably maintained in the range of 700° C. or higher and 850° C. or lower for 1 hour or longer and 24 hours or shorter. The rates of temperature increase and temperature decrease are not particularly limited, but are preferably 3° C./min or more and 8° C./min or less.

[Cracking and Slurrification]

It is preferred to crack the fired product in order to facilitate slurrification of the obtained fired product and wet pulverization in the next step. The cracking can be carried out by using ordinary cracking means, for example, a grinding machine, an edge runner type crusher, a hammer type crusher, an air flow type crusher, a high speed stirring type cracking machine, a twin rolls type mill, etc. After cracking the fired product, water is added to the cracked product for undergoing slurrification. By the slurrification, potassium dititanate undergoes hydration and cation exchange between potassium ions and protons, resulting in forming potassium hydrogen dititanate hydrate represented by $K_{2-x}H_xO.2TiO_2.nH_2O$ wherein x is 0.5 or more and 1.3 or less, and n is greater than 0.

[Wet Pulverization]

The slurry obtained by the above cracking and slurrification undergoes wet pulverization. However, if excessive wet pulverization is carried out, the pulverization progresses too much, lowering the mechanical strength of the adsorbent that is a final product, the wet pulverization is therefore appropriately carried out. For the wet pulverization, a usual wet pulverization method such as a bead mill or a high-pressure homogenizer can be used without limitation. The conditions for wet pulverization can be appropriately selected, depending on properties of potassium hydrogen dititanate hydrate in a slurry and treatment conditions after wet pulverization. For example, the pulverization conditions can be set so that a specific surface area of potassium hydrogen dititanate hydrate dried after the wet pulverization is 1.5 $m^2$/g or more and 15 $m^2$/g or less.

[Filtration]

The wet pulverized slurry undergoes solid-liquid separation by using an appropriate filtration device. The filtration device is not particularly limited, and a normal filtration device, for example, a filtration device under reduced pressure, a press type filtration device, etc., can be used. Considering facilitation of granulation, it is preferred that a water content of a filtered cake is 350 g/kg or more and 500 g/kg or less.

[Granulation]

The obtained filtered cake undergoes granulation. As a granulation method, the filtered cake may be directly extruded and granulated (wet granulation), or the filtered cake may be dried and then a lump of dried product may be pulverized and sized (dry granulation). As an extrusion granulator, a screw type extrusion granulator, a roll type extrusion granulator, a blade type extrusion granulator, a self-molding extrusion granulator, etc., can be used.

[Drying]

The wet granulated product is dried. A drying apparatus and a heat source thereof are not particularly limited, but it is preferable to dry at a temperature of 60° C. or higher and 150° C. or lower over a period of 1 hour or longer and 24 hours or shorter. Heating reduces an interlayer distance of the product. The interlayer distance affects the ion exchange capacity, and therefore, it is necessary to strictly control the temperature.

[Cracking and Sizing]

The dry granulated product or the dried granulated product after the wet granulation is cracked, and if necessary, a classifier is used so that it is sized by a particle size of 150 µm or more and 1000 µm or less, and more preferably 150 µm or more and 600 µm or less, to obtain a particulate cobalt ion adsorbent. When the particle size after sizing is within the above range, a filling volume in an adsorption tower, etc., can be maintained in a suitable range, and there is little possibility of clogging up the adsorption tower. When the filling volume becomes small, the cobalt ion adsorption capacity per unit volume decreases, which is not preferred, and when the adsorption tower is clogged up, water cannot flow, which is not preferred.

According to the present invention, there is also provided an apparatus for treating cobalt ion-containing liquid, comprising an adsorption container for water treatment or an adsorption tower, etc., filled with the aforementioned particulate cobalt ion adsorbent, preferably a decontamination apparatus for radioactive cobalt.

The particulate cobalt ion adsorbent of the present invention can be used by filling an adsorption container or adsorption tower having a strainer structure at the bottom or top. It can be effectively applied to an apparatus for treating cobalt ion-containing liquid in which contaminated water containing cobalt ions, particularly radioactive cobalt is passed through the adsorption container or the adsorption tower, and is then treated, or a decontamination apparatus for radioactive cobalt.

In the apparatus for treating cobalt ion-containing liquid or the apparatus for decontaminating radioactive cobalt of the present invention, the adsorption tower is preferably filled with the particulate cobalt ion adsorbent of the present invention so as to be a layer height of 10 cm or more and 300 cm or less, preferably 20 cm or more and 250 cm or less, and more preferably 50 cm or more and 200 cm or less. Within the above range, the adsorbent layer can be uniformly filled when filling the adsorption tower with the adsorbent, bringing about no short pass during water flow, and resulting in enabling prevention of quality of treated water from deterioration thereof. The higher the layer height is, the more appropriately a differential pressure for water flow can be realized, quality of the treated water is stabilized, and a total amount of treated water becomes large, which is preferred. In order to reduce the differential pressure for water flow, the layer height is preferably 300 cm or lower.

Moreover, according to the present invention, a method for treating cobalt ion-containing liquid, wherein passing cobalt ion-containing liquid through a cobalt ion-containing liquid decontamination apparatus to adsorb and remove cobalt ions, preferably a method for decontaminating radioactive cobalt, wherein passing radioactive cobalt-containing liquid through a radioactive cobalt decontamination apparatus to adsorb and remove radioactive cobalt ions is also provided.

When used for decontamination of radioactive cobalt, radioactive waste liquid containing radioactive cobalt is passed through an adsorption tower filled with the particulate cobalt ion adsorbent of the present invention, at a linear water flow velocity (LV) of 1 m/h or more and 40 m/h or less, preferably 2 m/h or more and 30 m/h or less, and more preferably 10 m/h or more and 20 m/h or less, and a space velocity (SV) of 40 $h^{-1}$ or less, preferably 30 $h^{-1}$ or less, and more preferably 20 $h^{-1}$ or less, and preferably 5 $h^{-1}$ or higher and more preferably 10 $h^{-1}$ or higher. When the linear water flow velocity exceeds 40 m/h, the differential pressure for water flow becomes large, and when it is less than 1 m/h, the amount of a treated water is small. Even if the space velocity (SV) is 20 $h^{-1}$ or less, which is employed in general waste liquid treatment, particularly about 10 $h^{-1}$, the effect of the particulate cobalt ion adsorbent of the present invention can be obtained, but by waste liquid treatment using a normal adsorbent, stable quality of treated water cannot be realized at a large space velocity (SV) exceeding 20 $h^{-1}$, and a removal effect cannot be obtained. In the present invention, the linear water flow velocity and the space velocity can be increased without increasing a size of the adsorption tower.

Incidentally, the linear water flow velocity is a value obtained by dividing an amount of water passing through an adsorption tower ($m^3$/h) by a cross-sectional area of the adsorption tower ($m^2$). The space velocity is a value obtained by dividing an amount of water passing through an adsorption tower ($m^3$/h) by a volume of the adsorbent with which the adsorption tower filled ($m^3$).

EXAMPLES

The present invention will be described in more detail with reference to Examples and Comparative Examples below. The examples described below are provided for exemplification purposes only and do not limit the scope of the invention.

Synthesis Example: Synthesis of Potassium Dititanate

To a metatitanic acid slurry comprising 14.75 kg of Ti in terms of titanium oxide, 15.75 kg of potassium carbonate (manufactured by Asahi Glass Inc.) was dissolved to prepare a raw material mixture slurry. The raw material mixture slurry was spray-dried to obtain a mixed dry product containing the titanium source and the potassium source.

2 kg of the resulting mixed dry product was placed in 2 saggars by 1 kg each, and fired in an electric furnace at a set temperature of 770° C. for 6 hours. The fired product obtained was cracked by using a hammer type mill. When the obtained powder was identified by an X-ray diffractometer (RINT-TTRIII manufactured by Rigaku Corporation), the peaks thereof were identical with those of potassium dititanate represented by chemical formula $K_2O \cdot 2TiO_2$. Moreover, the average particle size of the powder measured using a scanning electron microscope was 15 µm.

Example 1: Production of Particulate Cobalt Ion Adsorbent 400 g of potassium dititanate powder having a specific surface area of 1.0 $m^2$/g and an average particle size of 15 µm obtained in the synthetic example, was added to 2 L of water (rehydration) to prepare a slurry (slurrification). This slurry was wet pulverized twice. The specific surface area of the potassium hydrogen dititanate hydrate powder, which underwent solid-liquid separation after the wet pulverization and was dried, was 6.5 m²/g.

Next, the slurry was filtered under reduced pressure to obtain a filtered cake. The obtained filtered cake was dried at a set temperature of 110° C. for 15 hours for dry granulation, then cracked, and sized with a sieve to a particle size range of 300 μm or more and 600 μm or less to obtain a particulate cobalt ion adsorbent having a particle size range of 300 μm or more and 600 μm or less.

Example 2: Production of Particulate Cobalt Ion Adsorbent 400 g of potassium dititanate powder having a specific surface area of 1.0 m²/g and an average particle size of 15 μm obtained in the synthetic example, was added to 2 L of water (rehydration) to prepare a slurry (slurrification). This slurry was wet pulverized twice. The specific surface area of the potassium hydrogen dititanate hydrate powder, which underwent solid-liquid separation after the wet pulverization and was dried, was 4.7 m²/g.

Next, the slurry was filtered by using a press-type filter to obtain a filtered cake. The obtained filtered cake was granulated by using an extrusion molding machine, dried at a set temperature of 110° C. for 15 hours, then cracked, and sized with a sieve to a particle size range of 300 μm or more and 600 μm or less to obtain a particulate cobalt ion adsorbent having a particle size range of 300 μm or more and 600 μm or less.

Example 3: Production of Particulate Cobalt Ion Adsorbent 400 g of potassium dititanate powder having a specific surface area of 1.0 m²/g and an average particle size of 15 μm obtained in the synthetic example, was added to 2 L of water (rehydration) to prepare a slurry (slurrification). This slurry was wet pulverized twice. The specific surface area of the potassium hydrogen dititanate hydrate powder, which underwent solid-liquid separation after the wet pulverization and was dried, was 4.7 m²/g.

Next, the slurry was filtered by using a press-type filter to obtain a filtered cake. The obtained filtered cake was granulated by using an extrusion molding machine. To the obtained granulated product, 30 g of water per 1 kg of the obtained granulated product was sprayed, and then it was dried at a set temperature of 110° C. for 15 hours, then cracked, and sized with a sieve to a particle size range of 150 μm or more and 300 μm or less to obtain a particulate cobalt ion adsorbent having a particle size range of 150 μm or more and 300 μm or less.

Example 4: Production of Particulate Cobalt Ion Adsorbent 1200 g of potassium dititanate powder having a specific surface area of 1.0 m²/g and an average particle diameter of 15 μm obtained in the synthetic example, was added to 2 L of water (rehydration) to prepare a slurry (slurrification). This slurry was wet pulverized twice. The specific surface area of the potassium hydrogen dititanate hydrate powder, which underwent solid-liquid separation after the wet pulverization and was dried, was 9.9 m²/g.

Next, the slurry was filtered under reduced pressure to obtain a filtered cake. The obtained filtered cake was dried at a set temperature of 110° C. for 15 hours for dry granulation, then cracked, and sized with a sieve to a particle diameter range of 300 μm or more and 600 μm or less to obtain a particulate cobalt ion adsorbent having a particle diameter range of 300 μm or more and 600 μm or less.

Example 5: Production of Particulate Cobalt Ion Adsorbent 400 g of potassium dititanate powder having a specific surface area of 1.0 m²/g and an average particle size of 15 μm obtained in the synthetic example, was added to 2 L of water (rehydration) to prepare a slurry (slurrification). This slurry was wet pulverized once. The specific surface area of the potassium hydrogen dititanate hydrate powder, which underwent solid-liquid separation after the wet pulverization and was dried, was 3.6 m²/g.

Next, the slurry was filtered and washed by using a press-type filter to obtain a filtered cake. The obtained filtered cake was granulated by using an extrusion molding machine, dried at a set temperature of 110° C. for 15 hours, then cracked, and sized with a sieve to a particle size range of 150 μm or more and 600 μm or less to obtain a particulate cobalt ion adsorbent having a particle size range of 150 μm or more and 600 μm or less.

Comparative Example 1: Production of Particles Containing a Binder

After 200 g of potassium dititanate powder having a specific surface area of 1.0 m²/g and an average particle size of 15 μm obtained in the synthetic example, 60 g of natural zeolite SP-2300 manufactured by Nitto Funka Kogyo K.K. as a binder, and 6 g of PVA (polyvinyl alcohol) as a granulation aid, were mixed, rolling granulation was carried out while gradually adding 60 g of water. The granulated product was dried at a set temperature of 110° C. for 12 hours, and then sized with a sieve to a particle size range of 300 μm or more and 1000 μm or less. The sized powder was fired in an electric furnace at a set temperature of 630° C. for 5 hours. After the firing, the particles were again sized with a sieve to a particle size range of 300 μm or more and 1000 μm or less to obtain particles having a particle size range of 300 μm or more and 1000 μm or less.

Comparative Example 2: Production of Potassium Dititanate Particles

The potassium dititanate powder having a specific surface area of 1.0 m²/g and an average particle size of 15 μm obtained in the synthetic example, was cracked as it was. The specific surface area after the cracking was 1.3 m²/g. Further, the powder was sized with a sieve to a particle size range of 150 μm or more and 600 μm or less to obtain particles having a particle size range of 150 μm or more and 600 μm or less.

Comparative Example 3: Commercially Available Granular Adsorbent

The trade name "CoTreat" manufactured by Fortum Corporation, which was a commercially available granular cobalt ion adsorbent, was used. The composition of this commercially available product has not been published, but it is presumed to contain sodium titanate from the composition analysis results.

[Composition Analysis]

The titanium and potassium contents of the test sample were measured with an inductively coupled plasma mass spectrometer ICP-Mass (Agilent 7700x ICP-MS manufactured by Agilent Technologies, Inc.). From the contents, x of chemical formula $K_{2-x}H_xO \cdot 2TiO_2 \cdot nH_2O$, was calculated.

[X-Ray Diffraction]

By using an X-ray diffractometer RINT-TTRIII manufactured by Rigaku Corporation, an X-ray diffraction profile of the test sample was obtained at a scanning speed of 5 deg/min using $Cuk_\alpha$-ray as an X-ray source. When the X-ray diffraction intensity was small, an X-ray diffraction profile was obtained by performing a plurality of scans and integrating them. By using the analysis program attached to the X-ray diffractometer, a diffraction angle $2\theta$ of the main X-ray diffraction peak was calculated.

[Evaluation of Cobalt Adsorption Performance]

Figure 2:
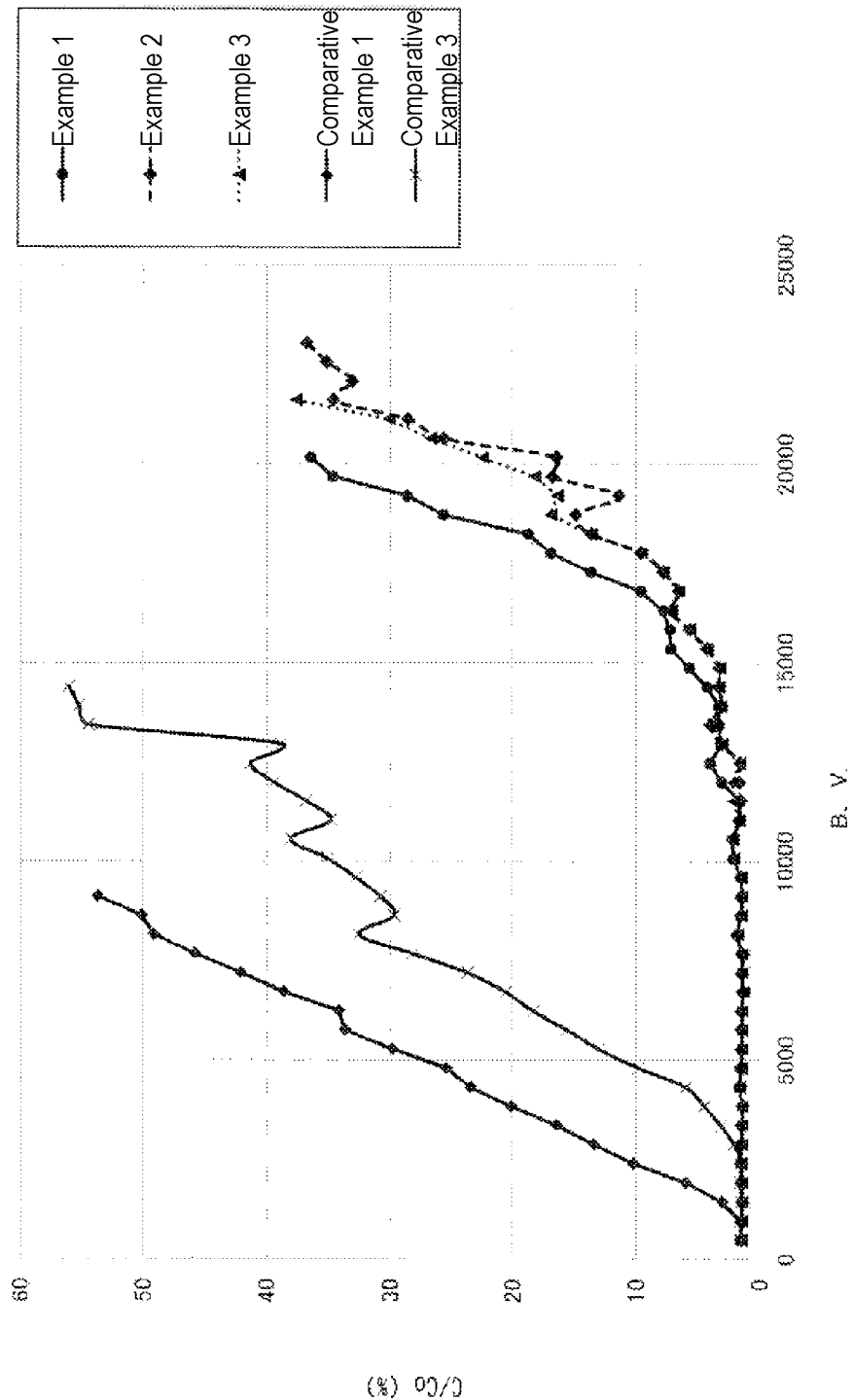
FIG. 2 is a graph showing cobalt removal performance by column tests of Examples 1, 2 and 3 and Comparative Examples 1 and 3.

The particulate cobalt ion adsorbents produced in Examples 1 to 5 and Comparative Examples 1 and 2 and the commercially available granular cobalt ion adsorbent of Comparative Example 3 were each filled in a cylindrical column having an inner diameter of 15.96 mm to a volume of 20 mL and a layer height of 100 mm. A simulated contaminated seawater prepared so as to contain a normal salt of 3 g/kg, cobalt of 1 mg/kg, magnesium of 5 mg/kg, and cesium of 1 mg/kg, was passed through each column at a flow rate of 6.5 mL/min (a linear water flow velocity of 2 m/h and a space velocity of 20 h$^{-1}$), water at an outlet was collected regularly, and a cobalt concentration in the simulated contaminated seawater was measured by using Agilent 7700x ICP-MS manufactured by Agilent Technologies, Inc. FIG. 2 shows the cobalt removal performance of Examples 1 to 3, Comparative Example 1 and Comparative Example 3. In FIG. 2, the horizontal axis is a B. V. (Bed Volume) which indicates how many times the amount of simulated contaminated seawater was passed through relative to a volume of the adsorbent, and the vertical axis is a value (C/C$_0$) obtained by dividing a cobalt concentration (C) at a column outlet by a cobalt concentration (C$_0$) at a column inlet. The B.V. at breakthrough refers to a B.V. at which C/C$_0$ is greater than 3% from the start of water flow, i.e., a B.V. at which a cobalt concentration at the column outlet is greater than 0.03 mg/kg.

[Collapsed State of Particulate Cobalt Ion Adsorbent]

Collapsed state of the cobalt ion adsorbent was evaluated. A flow down condition of the aqueous solution in the column test, a state of the particulate cobalt ion adsorbent and facilitation of removal thereof from the column after the column test, were judged and ranked as "excellent", "good", "acceptable" and "unacceptable".

Excellent: There is no problem in the flow down of the aqueous solution in the column test, the particles have not been collapsed even after the column test, and the particles can be easily removed from the column.

Good: There is no problem in the flow down of the aqueous solution and the removal of particles from the column in the column test, but some collapsing of the particles is observed after the column test.

Acceptable: There is no problem with the flow down of the aqueous solution in the column test, but after the column test, the particles have collapsed, which has a problem of removing the particles from the column.

Unacceptable: There is a problem with the flow down of the aqueous solution in the column test, and the particles have collapsed to the extent that the particles cannot be easily removed from the column.

The results are summarized in Table 1.

[Table 1]

TABLE 1

| | Binder | Particle size μm | x*1 | Main peak 2θ deg | B.V. at breakthrough m³/m³ | Collapsed state*2 |
|---|---|---|---|---|---|---|
| Example 1 | None | 300~600 | 1.10 | 9.4 | 12000 | Excellent |
| Example 2 | None | 300~600 | 1.24 | 7.2 | 12960 | Excellent |
| Example 3 | None | 150~300 | 1.02 | 10.1 | 12960 | Good |
| Example 4 | None | 300~600 | 0.58 | 10.4 | 11520 | Excellent |
| Example 5 | None | 150~600 | 1.24 | 9.0 | 11520 | Good |
| Comparative Example 1 | Presence | 300~1000 | 0.08 | 13.3 | 1440 | Excellent |
| Comparative Example 2 | None | 150~600 | 0.02 | 13.5 | Unmeasurable | Unacceptable |
| Comparative Example 3 | Presence | — | — | — | 3360 | Acceptable |

*1 x represented in chemical formula $K_{2-x}H_xO \cdot 2TiO_2 \cdot nH_2O$
*2 Collapsed state of the particles after the column test From Table 1 and FIG. 2, Examples 1 to 5 each exhibits the larger B.V. until cobalt is detected than Comparative Examples 1 and 3, indicating the high cobalt adsorption performance. Since the particles collapsed in the column in Comparative Example 2, it became difficult for the aqueous solution to flow down, and the B.V. at breakthrough was unmeasurable.

The invention claimed is:

1. A particulate cobalt ion adsorbent comprising potassium hydrogen dititanate hydrate represented by chemical formula $K_{2-x}H_xO \cdot 2TiO_2 \cdot nH_2O$ wherein x is 0.5 or more and 1.3 or less, and n is greater than 0, and no binder, wherein the particulate cobalt ion adsorbent has a particle size range of 150 μm or more and 1000 μm or less.

2. The particulate cobalt ion adsorbent according to claim 1, wherein the particulate cobalt ion adsorbent has an X-ray diffraction peak at 2θ=8.5±2.0° in X-ray diffraction using $Cuk_\alpha$-ray as an X-ray source.

3. The particulate cobalt ion adsorbent according to claim 1, wherein the particulate cobalt ion adsorbent exhibits a cobalt adsorption performance represented by B.V. of 8000 m³/m³ or more at breakthrough at which a percentage of a cobalt concentration in water at an outlet (C) based on a cobalt concentration in water at an inlet (C$_0$) is greater than 3%, wherein the particulate cobalt ion adsorbent is filled in a cylindrical column having an inner diameter of 15.96 mm to a layer height of 10 cm, and a simulated contaminated seawater comprising 3 g/kg of a normal salt, 1 mg/kg of cobalt, 5 mg/kg of magnesium, and 1 mg/kg of cesium is passed through the column at a flow rate of 6.5 mL/min (a linear water flow velocity of 2 m/h and a space velocity of 20 $h^{-1}$).

4. A method for producing the particulate cobalt ion adsorbent comprising potassium hydrogen dititanate hydrate represented by chemical formula $K_{2-x}H_xO.2TiO_2.nH_2O$ wherein x is 0.5 or more and 1.3 or less, and n is greater than 0, and no binder, wherein the particulate cobalt ion adsorbent has a particle size range of 150 μm or more and 1000 μm or less, comprising subjecting potassium dititanate represented by chemical formula $K_2O.2TiO_2$ to hydration and cation exchange between potassium ions ($K^+$) and protons ($H^+$) to obtain potassium hydrogen dititanate hydrate represented by chemical formula $K_{2-x}H_xO.2TiO_2.nH_2O$ wherein x is 0.5 or more and 1.3 or less, and n is greater than 0, and granulating the potassium hydrogen dititanate hydrate without using a binder.

5. The method according to claim 4, comprising steps of:
   (1) mixing a titanium source and a potassium source,
   (2) firing the resulting mixture to obtain potassium dititanate,
   (3) contacting potassium dititanate with water for hydration and cation exchange between potassium ions and protons,
   (4) wet pulverizing the resulting potassium hydrogen dititanate hydrate ($K_{2-x}H_xO.2TiO_2.nH_2O$ wherein x is 0.5 or more and 1.3 or less, and n is greater than 0) in a slurry,
   (5) subjecting the slurry to solid-liquid separation to separate a filtered cake comprising potassium hydrogen dititanate hydrate from the slurry,
   (6) granulating the filtered cake into particles of potassium hydrogen dititanate hydrate without using a binder,
   (7) drying potassium hydrogen dititanate hydrate at a temperature of 60° C. or higher and 150° C. or lower for 1 hour or longer and 24 hours or shorter, and
   (8) cracking and sizing the dried potassium hydrogen dititanate hydrate to obtain a particulate cobalt ion adsorbent having a particle size range of 150 μm or more and 1000 μm or less.

6. An apparatus for treating cobalt ion-containing liquid, filled with the particulate cobalt ion adsorbent comprising potassium hydrogen dititanate hydrate represented by chemical formula $K_{2-x}H_xO.2TiO_2.nH_2O$ wherein x is 0.5 or more and 1.3 or less, and n is greater than 0, and no binder, wherein the particulate cobalt ion adsorbent has a particle size range of 150 μm or more and 1000 μm or less.

7. An apparatus for decontaminating radioactive cobalt, filled with the particulate cobalt ion adsorbent comprising potassium hydrogen dititanate hydrate represented by chemical formula $K_{2-x}H_xO.2TiO_2.nH_2O$ wherein x is 0.5 or more and 1.3 or less, and n is greater than 0, and no binder, wherein the particulate cobalt ion adsorbent has a particle size range of 150 μm or more and 1000 μm or less.

8. A method for treating cobalt ion-containing liquid, using the particulate cobalt ion adsorbent comprising potassium hydrogen dititanate hydrate represented by chemical formula $K_{2-x}H_xO.2TiO_2.nH_2O$ wherein x is 0.5 or more and 1.3 or less, and n is greater than 0, and no binder, wherein the particulate cobalt ion adsorbent has a particle size range of 150 μm or more and 1000 μm or less.

9. A method for decontaminating radioactive cobalt, using the particulate cobalt ion adsorbent comprising potassium hydrogen dititanate hydrate represented by chemical formula $K_{2-x}H_xO.2TiO_2.nH_2O$ wherein x is 0.5 or more and 1.3 or less, and n is greater than 0, and no binder, wherein the particulate cobalt ion adsorbent has a particle size range of 150 μm or more and 1000 μm or less.

10. A method for treating cobalt ion-containing liquid according to claim 8, comprising passing cobalt ion-containing liquid through an apparatus for treating cobalt ion-containing liquid, filled with the particulate cobalt ion adsorbent at a linear water flow velocity (LV) of 1 m/h or more and 40 m/h or less and a space velocity (SV) of 5 $h^{-1}$ or more and 40 $h^{-1}$ or less.

11. A method for decontaminating radioactive cobalt according to claim 9, comprising passing radioactive cobalt-containing liquid through a decontamination apparatus for radioactive cobalt, filled with the particulate cobalt ion adsorbent at a linear water flow velocity (LV) of 1 m/h or more and 40 m/h or less and a space velocity (SV) of 5 $h^{-1}$ or more and 40 $h^{-1}$ or less.

12. The particulate cobalt ion adsorbent according to claim 1, wherein the particulate cobalt ion adsorbent has an X-ray diffraction peak at 2θ=8.5±2.0° in X-ray diffraction using $Cuk_\alpha$-ray as an X-ray source, and wherein the particulate cobalt ion adsorbent exhibits a cobalt adsorption performance represented by B.V. of 8000 $m^3/m^3$ or more at breakthrough at which a percentage of a cobalt concentration in water at an outlet (C) based on a cobalt concentration in water at an inlet ($C_0$) is greater than 3%, wherein the particulate cobalt ion adsorbent is filled in a cylindrical column having an inner diameter of 15.96 mm to a layer height of 10 cm, and a simulated contaminated seawater comprising 3 g/kg of a normal salt, 1 mg/kg of cobalt, 5 mg/kg of magnesium, and 1 mg/kg of cesium is passed through the column at a flow rate of 6.5 mL/min (a linear water flow velocity of 2 m/h and a space velocity of 20 $h^{-1}$).

\* \* \* \* \*